United States Patent [19]

Cogan

[11] 4,283,281
[45] Aug. 11, 1981

[54] HIGH PRESSURE FILTER VESSEL

[75] Inventor: Leo M. Cogan, Skokie, Ill.

[73] Assignee: Textile Industries, Inc., Chicago, Ill.

[21] Appl. No.: 89,282

[22] Filed: Oct. 29, 1979

[51] Int. Cl.³ .............................................. B01D 29/10
[52] U.S. Cl. .................................. 210/232; 210/453; 210/484; 210/491
[58] Field of Search ............... 210/232, 251, 445, 451, 210/453, 484, 491, 512, 541; 55/373, 376, 378, 380–381, 418, 502

[56] References Cited

U.S. PATENT DOCUMENTS

| | | | |
|---|---|---|---|
| 3,640,392 | 2/1972 | Smith et al. | 55/373 |
| 3,774,769 | 11/1973 | Smith | 210/445 |
| 3,814,261 | 6/1974 | Morgan, Jr. | 210/232 |
| 3,959,137 | 5/1976 | Kirsgalvis | 210/232 |
| 4,157,964 | 6/1976 | Rishel | 55/373 |

*Primary Examiner*—Ernest G. Therkorn
*Assistant Examiner*—E. Rollins Cross
*Attorney, Agent, or Firm*—Silverman, Cass & Singer, Ltd.

[57] ABSTRACT

A filter vessel primarily for use in filtering a fluid passed through the vessel under pressure. The housing is provided by an upstanding, circumferential sidewall open at its upper end. The housing supports a reticulated basket for restraining and suspending a filter bag therein. A collar is mounted around the sidewall in the vicinity of the upper end and in cooperative arrangement with a sealing cap installed over and clearing the upper end to provide a discrete liquid flow path for fluid entering through an inlet port in the collar. The fluid path extends substantially uninterrupted from the inlet port, around the sidewall and over the upper end below the cap and, thereafter, into the filter bag over substantially the entire perimetric entrance to the basket.

11 Claims, 3 Drawing Figures

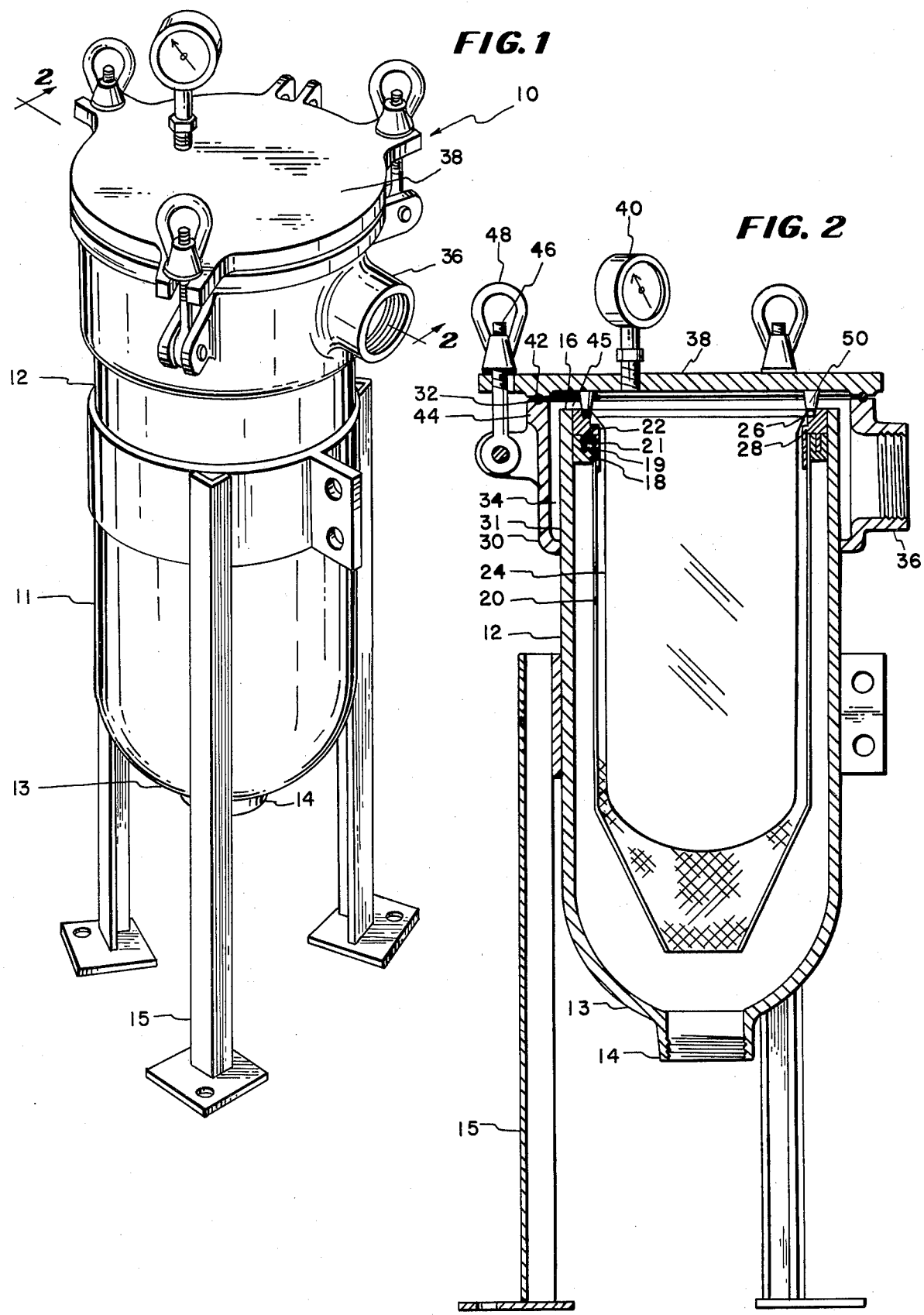

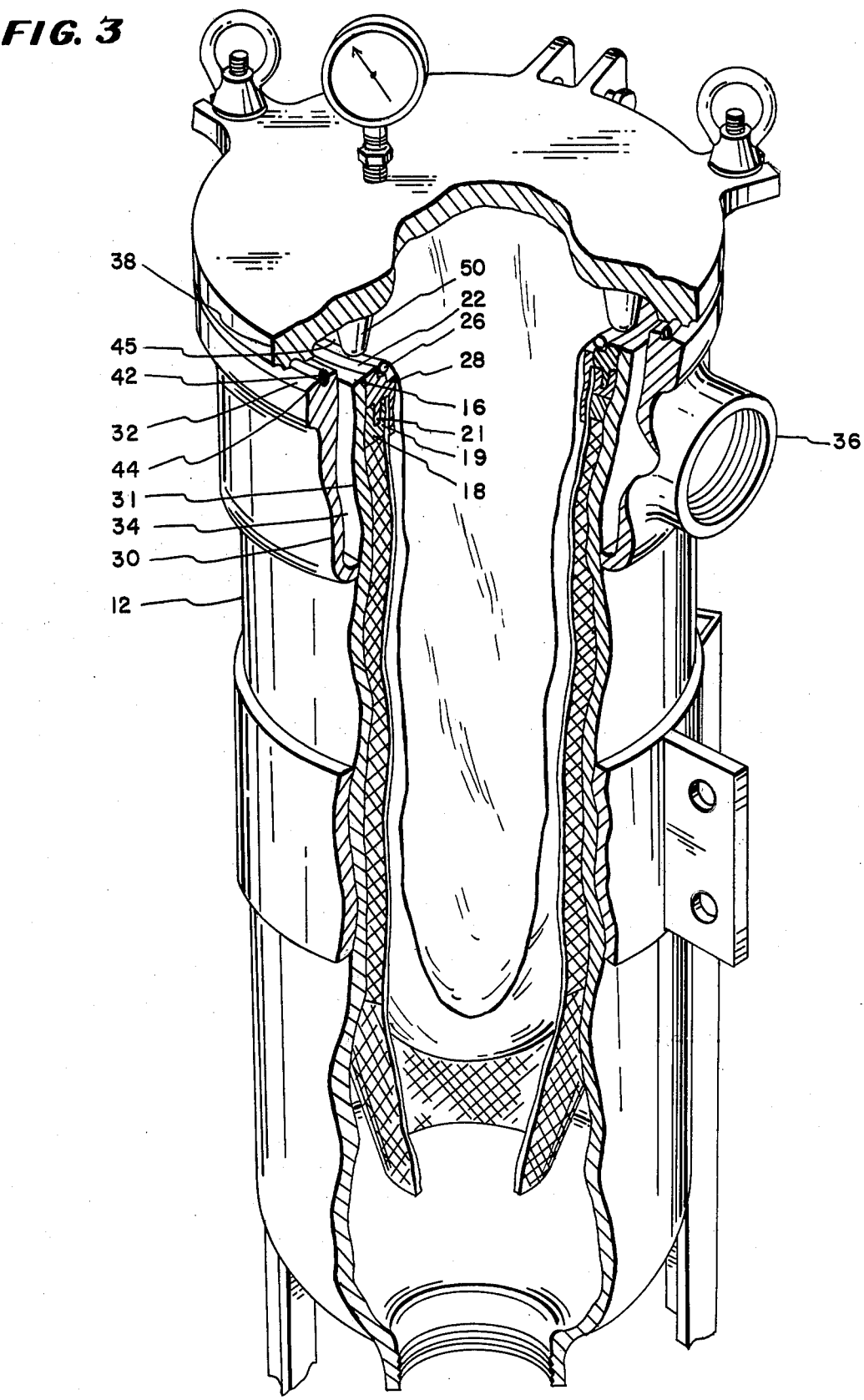

HIGH PRESSURE FILTER VESSEL

BACKGROUND OF THE INVENTION

This invention relates to high pressure filter vessels primarily for use in filtering liquids through a bag filter element suspended in the vessel, and more specifically relates to an improved filter vessel which provides distributed liquid flow to the bag filter.

Pressurized liquid filters have become widely employed in industrial filtering operations because high pressure allows continuous, large capacity filtration at high flow rate in relatively compact equipment space. Bag filter elements developed for use in high pressure filtering facilitate difficult separations, such as recovery of carbon black from hydrocarbon pyrolysis effluent, which otherwise require prohibitive time. In continuous service, recurrent replacement of caked filter bags is an important factor in the design of the filter vessel or housing.

In older design of filter bag pressure vessels, the liquid inlet to the filter was fabricated in the housing cover, generally a central port in the cover. Opening the cover to replace filter bag elements generally involved repeated manual disconnection of plumbing couplings between the pressurized liquid supply lines and the cover inlet, as described in U.S. Pat. No. 3,640,392, issued to Smith et al.

In newer design of filter bag pressure vessels, disconnection of plumbing coupling can be eliminated from normal filter bag replacement because the liquid inlet to the filter is formed in the vessel sidewall as described in U.S. Pat. No. 3,814,261 issued to Morgan. This patent proposes a liquid filter having a filter housing for a reticulated basket and a filter bag supported in the basket with the upper margin of the bag making sealing contact with a top fitted over the housing. The top includes an upwardly offset marginal portion which cooperates with a liquid inlet in the housing sidewall to define a passage utilized to direct liquid from the inlet upwardly and over the upper edge of the filter bag and into the bag. A disadvantage in the operation of this structure is that the liquid flow pattern into the filter bag is limited to the portion of the upper edge of the filter bag directly below the corresponding upper offset marginal portion of the top which can also create channeled or localized flow pattern through the filter bag resulting in folded sections of the bag.

The development of the high pressure filter vessel of this invention provides a fluid path distributed over substantially the entire entrance to a restraining basket and filter bag promoting uniform flow through the filter bag and improving the effective filtering surface of the filter bag.

SUMMARY OF THE INVENTION

The filter vessel of this invention has a housing provided by an upstanding, circumferential sidewall open at its upper end. The housing supports a reticulated basket for restraining and suspending a filter bag therein. A collar is mounted around the sidewall in the vicinity of the upper end in cooperative arrangement with a sealing cap installed over and clearing the upper end to provide a discrete liquid flow path for fluid entering through an inlet port in the collar. The fluid path extends substantially uninterrupted from the inlet port, around the sidewall and over the upper end below the cap and, thereafter, into the filter bag over substantially the entire perimetric entrance to the basket.

The removable cap for the vessel can be sealed on the upper edge of the collar and provides clearance above the upper end of the sidewall for the fluid path into the basket and filter bag. The cap can have projections which press together flanges formed on the filter bag and basket to secure their seating when the filter bag is inserted into the restraining basket.

The circumferential conduit formed by the collar on the vessel provides a fluid path distributed over substantially the entire entrance to the basket and filter bag promoting uniform flow through the filter bag and improving the effective filtering surface of the filter bag as well as preventing formation of folds in the bag.

BRIEF DESCRIPTION OF THE DRAWING

FIG. 1 is a perspective view of one embodiment of the filter vessel of this invention.

FIG. 2 is a sectional view taken along line 2—2 of FIG. 1.

FIG. 3 is a perspective view of the filter vessel with portions broken away to show structural features of the entrance to the basket and associated filter bag.

DESCRIPTION OF THE PREFERRED EMBODIMENTS

In a preferred embodiment of the pressurized filter vessel of the invention, designated generally by the reference character 10 in FIGS. 1-3, the vessel housing 11 has a cylindrical upstanding sidewall 12 with a closed, rounded bottom 13 having a port 14 which is the liquid outlet in normal operation. While the cylindrical shape of sidewall 12 having generally circular circumference is preferred, other sidewall configurations having non circular circumferences, such as rectangular or square circumference, can be employed in the filter vessel of this invention. Typically, three or more legs 15 support the housing in an upright position.

Referring to FIG. 2, cylindrical sidewall 12 terminates in an open upper top or end 16, and a sidewall flange 18 is secured to the interior surface of sidewall 12 preferably adjacent to end 16. A removable screen or reticulated basket 20 of conventional wire or perforated sheet material construction is suspended within sidewall 12 supported by sidewall flange 18; sidewall flange 18 preferably has an annular slot 19 opening upward to receive an annular tongue 21 depending from an annular basket flange 22 seated on sidewall flange 18. Annular basket flange 22 defines the entrance perimeter of basket 20 and filter bag 24 suspended within basket 20.

Filter bag 24 fabricated of porous material, typically felt of synthetic or natural fiber, has a generally circular ring or bag flange 26 preferably formed of rigid or semi-rigid material such as rubber, metal or plastic. To support bag 24, bag flange 26 is seated preferably against an annular ledge 28 formed in basket flange 22.

A collar 30 is mounted on and surrounds the circumference of a portion 31 of sidewall 12 in location preferably such that the upper edge 32 of collar 30 is above and adjacent to the end 16 of sidewall 12. Collar 30 forms a conduit or fluid path providing uniform distribution of liquid flow over substantially the entire entrance perimeter of basket 20 upon passage into the filter bag 24. While the shape of collar 30 is not critical, collar 30 surrounds the circumference of sidewall 12 and preferably cooperates with sidewall 12 to form an annular passage 34. The collar 30 can be attached to the sidewall 12 by welding or can be integrally cast. At least one port 36 in collar 30 provides liquid inlet in normal operation leading to annular passage 34.

A removable cover or cap 38, typically fitted with a relief valve or pressure gauge 40, fits upon collar 30 to make a peripheral seal, preferably by engagement with an O-ring 42 seated within a groove 44 in the upper edge 32 of collar 30. A clearance space 45 is provided above end 16 and above basket flange 22 and bag flange 26. The clearance space 45 allows fluid to flow from annular passage 34 over the end 16 and below cap 38 for passage over substantially the entire perimeter of basket flange 22. Cap 38 can be secured by a variety of fasteners such as one or more toggle bolts 46 carried by collar 30 and secured to cover 38 with eye bolt nuts 48. Cap 38 has a plurality of downward projections 50, preferably about four projections, equally spaced and aligned with the ledge 28. Projections 50 are sufficiently long so as to press bag flange 26 against basket flange 22 in order to secure the seating and form a seal between the two flanges; alternatively, other means for securing such flange seating can be employed. Thus, with the exception of the points of contact between the projections 50 and bag flange 26, substantially the entire perimeter bag flange 26, over basket flange 22 is in fluid communication with annular passage 34.

In the normal performance of the filter vessel of this invention, liquid entering port 36 is distributed in annular passage 34. Distributed flow upward within passage 34 continues through clearance 45 below cap 38 such that the distributed flow passes over the end 16 of sidewall 12 and over substantially the entire perimeter of basket flange 22, past projections 50 substantially uninterrupted, and contacts substantially the entire perimeter of bag flange 26 upon descent into the interior of filter bag 24. The liquid then passes uniformly through the filter bag 24, through the holes in reticulated basket 20 into the volume between the basket 20 and housing walls 12 and 13, then exiting through port 14. If it is expedient to reverse the normal flow, the filter bag can be fitted over the outside of the basket under suitable modification.

I claim:

1. A filter vessel for retaining a filter bag in a fluid path for filtering fluid passing through the vessel under pressure, said vessel comprising:
   (1) an otherwise closed vessel defined by an upstanding, circumferential sidewall having an open upper end and a fluid outlet port remote from said upper end;
   (2) removable cap means installed over said upper end;
   (3) flange support means secured to the sidewall on the interior of the vessel;
   (4) a reticulated basket for retaining a filter bag suspended therein;
   (5) said basket having annular flange means cooperatively engaged with the flange support means for supporting the basket in the vessel and defining a perimetric entrance into the filter bag suspended in the basket;
   (6) said vessel having collar means mounted on the sidewall adjacent said upper end and defining said fluid path;
   A. said collar means including a fluid inlet port;
   B. said fluid path extending substantially uninterrupted from said inlet port around the circumference of said sidewall and over said upper end below said cap means, said fluid inlet port and said fluid path cooperating to discharge said fluid under pressure into the filter bag over substantially the entire perimetric entrance of said basket for efflux thereafter from the vessel through said outlet port; and
   (7) wherein said cap means has a plurality of depending projections in registry with said flange support means for engaging a filter bag supported on said flange support means to retain the filter bag securely suspended in the basket, said plurality of depending projections cooperating with said flange support means to position the filter bag such that said cap means is entirely spaced above the filter bag.

2. The vessel claimed in claim 1 wherein said fluid path includes an annular passage formed between said sidewall and said collar means.

3. The vessel claimed in claim 1 or 2 in which said collar means has an annular seating edge spaced above said upper end, said cap means being installed on said seating edge in sealed engagment with the collar means.

4. The vessel claimed in claim 3 in which said annular seating edge includes a sealing ring supported therein for engaging said cap means.

5. The vessel claimed in claim 1 wherein said projections are equally spaced apart one from the other.

6. The vessel claimed in claim 1 in which said flange support means has an annular slot opening toward said upper end, said basket flange means having a cooperating annular tongue mating within said slot for supporting the basket on said flange support means.

7. In a vessel for retaining a filter bag in a fluid path for filtering fluid passing through the vessel under pressure, said vessel having an open end, a cap removably installed over said open end, a reticulated basket for a filter bag suspended in the basket, the basket being supported in the vessel below said open end, annular collar means having an inlet port secured around a circumferential wall of said vessel adjacent said open end, said collar means having an annular wall spaced from the circumferential wall of the vessel to provide a fluid path around said circumferential wall, said collar means having a seating edge spaced above the open end of the vessel adapted to seat matingly with said cap and entirely space said cap above said open end to provide an annular clearance space for substantially uninterrupted fluid discharge into the basket from said fluid path over substantially the entire extent of said open end.

8. The vessel claimed in claim 7 wherein said fluid path includes an annular passage formed between said circumferential wall and said collar means.

9. The vessel claimed in claim 7 or 8 in which said annular seating edge includes a sealing ring supported therein for engaging said cap means.

10. The vessel claimed in claim 7 wherein said basket has a flange means for supporting the basket in the vessel, said cap having a plurality of depending projections in registry with said flange means for engaging a filter bag supported on the flange means to retain the filter bag securely suspended in the basket.

11. The vessel claimed in claim 10 wherein said projections are equally spaced apart one from the other.

* * * * *